(12) United States Patent
Nchari et al.

(10) Patent No.: US 11,390,400 B2
(45) Date of Patent: Jul. 19, 2022

(54) POWDER DISPENSERS AND METHODS OF DISPENSING POWDER

(71) Applicant: Koninklijke Douwe Egberts B.V., Utrecht (NL)

(72) Inventors: Luanga Nchari, Hurley (GB); Neil Rogers, Hurley (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 17/311,247

(22) PCT Filed: Dec. 3, 2019

(86) PCT No.: PCT/EP2019/083539
§ 371 (c)(1),
(2) Date: Jun. 4, 2021

(87) PCT Pub. No.: WO2020/120235
PCT Pub. Date: Jun. 18, 2020

(65) Prior Publication Data
US 2022/0024614 A1 Jan. 27, 2022

(30) Foreign Application Priority Data
Dec. 10, 2018 (GB) ...................... 1820061

(51) Int. Cl.
*B65B 1/12* (2006.01)
*B65B 37/10* (2006.01)
(Continued)

(52) U.S. Cl.
CPC ................. *B65B 1/12* (2013.01); *A47J 31/40* (2013.01); *B01F 27/1143* (2022.01); *B65B 37/10* (2013.01)

(58) Field of Classification Search
CPC .. B65B 1/10; B65B 1/12; B65B 37/08; B65B 37/10; A47J 31/40; B01F 27/114; B01F 27/1142; B01F 27/1143
See application file for complete search history.

(56) References Cited

U.S. PATENT DOCUMENTS 3,473,516 A * 10/1969 Legrain ................ B01F 33/821
  119/71
3,489,187 A * 1/1970 Crow ........................ B65B 1/36
  141/162

(Continued)

FOREIGN PATENT DOCUMENTS

| CN | 208412199 | 1/2019 |
| JP | H0199641 A | 4/1989 |

(Continued)

OTHER PUBLICATIONS

International Search Report and Written Opinion dated Mar. 18, 2020; International Application No. PCT/EP2019/083539; (12 pgs.).

(Continued)

*Primary Examiner* — Nicolas A Arnett
(74) *Attorney, Agent, or Firm* — Fitch, Even, Tabin & Flannery LLP (57) ABSTRACT

The invention provides a powder dispenser comprising a tube of circular cross-section; an auger extending axially through the tube; and a disc-shaped distributor extending laterally to the axis of the tube and partially closing the tube, wherein the disc-shaped distributor comprises a central ring and arms extending radially therefrom, characterised in that, the central ring has a radius of between 55%-90% of the internal radius of the tube; at least one of the arms extends to no more than 1 mm from the internal wall of the tube; and wherein there is a distance defined by a circular arc con- (Continued)

centric with the tube between each arm at a distance of 1 mm from the tube wall of between 30%-65% of the internal radius of the tube.

17 Claims, 5 Drawing Sheets

(51) Int. Cl.
*A47J 31/40* (2006.01)
*B01F 27/1143* (2022.01)

(56) References Cited

U.S. PATENT DOCUMENTS

| | | | | | |
|---|---|---|---|---|---|
| 3,687,250 | A | * | 8/1972 | James | B65B 1/12 |
| | | | | | 192/18 B |
| 3,879,917 | A | * | 4/1975 | Bassendale | B65B 9/213 |
| | | | | | 53/469 |
| 3,966,124 | A | * | 6/1976 | Sukup | A01F 25/186 |
| | | | | | 239/666 |
| 5,355,833 | A | * | 10/1994 | Legrain | A01K 9/00 |
| | | | | | 119/71 |
| 5,832,700 | A | * | 11/1998 | Kammler | B65B 37/10 |
| | | | | | 53/53 |
| 6,367,417 | B1 | * | 4/2002 | Gal | A01K 5/0283 |
| | | | | | 119/51.5 |
| 6,923,389 | B2 | * | 8/2005 | Shivvers | B65G 69/0458 |
| | | | | | 239/681 |
| 10,913,555 | B2 | * | 2/2021 | Dersch | B65B 9/22 |
| 11,059,685 | B2 | * | 7/2021 | Cota | B65G 69/0441 |
| 2012/0205007 | A1 | * | 8/2012 | Girard | B01J 8/002 |
| | | | | | 141/387 |
| 2013/0025739 | A1 | * | 1/2013 | Cottard | B01J 8/003 |
| | | | | | 422/310 |
| 2013/0298507 | A1 | * | 11/2013 | Poussin | B65G 69/0441 |
| | | | | | 53/473 |

FOREIGN PATENT DOCUMENTS

| | | |
|---|---|---|
| JP | H10316110 A | 12/1998 |
| JP | 2007204137 | 8/2007 |
| JP | 2014131915 | 7/2014 |
| JP | S6484801 | 3/2019 |
| WO | 9723155 | 7/1997 |
| WO | 2017174273 A1 | 10/2017 |

OTHER PUBLICATIONS

Search Report Under Section 17(5) dated Jun. 4, 2019; Application No. GB1820061.8 (4 pgs.).

* cited by examiner

Fig. 8

POWDER DISPENSERS AND METHODS OF DISPENSING POWDER

CROSS REFERENCE TO RELATED APPLICATIONS

This application is a U.S. national phase application of International Application No. PCT/EP2019/083539, filed Dec. 3, 2019, which claims benefit from United Kingdom Application 1820061.8, filed Dec. 10, 2018, which are each hereby incorporated herein by reference in their entirety.

TECHNICAL FIELD OF THE INVENTION

The present invention relates to powder dispensers and powder filling machines, particularly to methods and devices for metering the flow of powders from such dispensers or machines and to methods of filing flexible containers with free-flowing powders using such devices. The invention further relates to spinning discs comprising openings or perforations for metering powder from powder dispensers and powder filling machines.

BACKGROUND TO THE INVENTION

Powder dispensing machines, powder dispensers and powder filling machines are well known. Powder dispensers and powder dispensing machines are analogous whereas powder filling machines typically include a further component to form or handle the container that is to be filled. All three devices are used to dispense measured amounts of powder; typically to fill a container or package. The container or package can be of almost any design, including rigid containers, bottles, cartons or flexible film packages such as stick packs.

Stick packs are a common packaging format for many powders. They are also well-known in the art as generally 'stick' or tube-shaped containers formed of any suitable sheet material such as paper, plastic, metal, laminates, etc. In powder applications, stick packs are typically formed from sheet material at the point of filling to simplify handling and processing. An example of a prior art powder filling machine designed to be used to form and fill a stick pack is a model TM70-ZC machine, manufactured by Toyo Machine Manufacturing Co. The model TM70-ZC generally comprises a powder hopper and associated auger to move the powder down a tube from the hopper. At the bottom of the tube is a perforated disc (also known as a "spinning disc" or "rotating disc" or "disc shaped distributor") closing the tube. The disc is attached to the end of the auger and is intended to allow powder to pass through its perforations when rotating and to arrest the flow the of powder completely when not being rotated by the auger. Spinning discs of the prior art function adequately with many powders and have remained substantially the same for many years.

Powders can be defined by their ability to flow when poured from a container. An analytical measure of such a property is defined by the Hausner's ratio. Hausner's ratio is calculated as the ratio of bulk density to the packed density of a powder. Hausner's ratio is calculated as follows:

1—A known mass of test powder is poured through a funnel into a measuring cylinder and the volume the powder occupies is read off.

2—From calculation of the mass of the test powder divided by volume, the bulk density is recorded.

3—The cylinder is then tapped 150 times to pack the test powder and a new volume occupied by the test powder is read off 4—From calculation of the mass of the test powder divided by this new volume, the packed density is recorded.

5—The Hausner's ratio is then calculated as the ratio of the tapped density divided by the bulk density.

Table 1 shows a classification of powder flow character based on the Hausner's ratio.

TABLE 1

Hausner's ratio and flow character of powders

| Flow character | Hausner's ratio |
|---|---|
| Excellent/very free-flowing | 1.00-1.11 |
| Good/free-flowing | 1.12-1.18 |
| Fair | 1.19-1.25 |
| Passable | 1.26-1.34 |
| Poor/cohesive | 1.35-1.45 |
| Very poor/very cohesive | 1.46-1.59 |
| Very, very poor/approx. no flow | >1.60 |

Fine control of the flow of powders in stick pack filling machines is particularly desirable as any powder flow present when the stick pack is being sealed downstream of the dispensing tube, results in a weakened or failed seal as excess powder inhibits the adhesion of the layers of flexible material to one another.

Spinning discs of the prior art are known to fail to arrest the flow of some free-flowing and very free-flowing powders, that is powders with a Hausner's ratio of <1.18, or up to 1.25.

It would be advantageous to provide a powder filling machine and/or spinning disc that improves the cessation of flow of free-flowing powders in order to allow a packaging seal to be created in a stick pack sufficient to stop the package reopening during the supply chain.

It would be advantageous to provide a powder filling machine and/or a spinning disc that would work in conjunction more free-flowing powders; further it would be advantageous to provide a powder filling machine and/or a spinning disc that arrests the flow of very free-flowing and/or free flowing powders, i.e. powders with a Hausner's ratio of 1.00-1.11 and/or 1.12-1.18 and/or 1.19-1.25.

It would be advantageous to provide a powder filling machine and/or a spinning disc that arrests the flow of very free-flowing and/or free flowing powders, i.e. powders with a Hausner's ratio of 1.00-1.11 and/or 1.12-1.18 and/or 1.19-1.25, when stationary, yet permits the free-flow of powder when spinning, particularly over significant durations such as required in a 24-hour production run.

Embodiments of powder dispensers of the prior art with alternate powder metering methods are: powder metering by choke valve, powder metering by shutter gate, powder metering by spinner plate. Each presents unique disadvantages when used in conjunction with a stick-pack packaging format.

A powder dispenser metered by a choke valve generally comprises a powder hopper and associated auger to move the powder down a tube from the hopper. Beyond the end of the auger but within the tube is a choke valve pivoting about an axis lateral to the length of the tube. With the choke valve open and auger turning, powder can be metered from the tube. With the choke valve closed and auger stopped, the powder flow is arrested. The problems presented by this are complexity in driving and programming the choke valve and auger separately or very complicated gearing within the tube; a static barrier to powder flow even with the choke valve in the open position and additional mechanism and/or width to the tube that inhibits the ease of flow of packaging film material along the outside of the tube, thus preventing or inhibiting the downstream formation of a stick pack package.

A powder dispenser metered by a shutter gate works in a largely similar way to that comprising a choke valve, differing only in that the choke valve is replaced by a shutter gate (or gates) that slides laterally to the direction of the length of the tube and can be in a closed or open position. The problems presented by this are similar to those of a choke valve i.e. added complexity in driving and programming the shutter gate and auger separately and added width and mechanism beyond the width of the tube inhibiting or preventing the flow of flexible packaging material down the outside of the tube in order to create a stick pack package downstream of the dispensing tube.

A powder dispenser metered by a spinner plate is similar to that of a powder dispenser comprising a spinning disc. It differs in that the spinner plate does not comprise perforations and is positioned in a bell-shaped housing pendant to the bottom of the powder dispensing tube. The spinner plate is driven by the auger and operates by allowing powder flow when spinning yet arrests flow when stationary. Powder builds up on the spinner plate when stationery to form a column of powder up the powder dispenser tube. When spinning the powder is moved, by the rotation of the plate, outward and into the bell-shaped housing where it is directed downwards and dispensed. The problems presented by this are additional length of the powder dispensing tube incorporating the bell-shaped housing and a large increase in overall diameter of the powder dispensing tube at the bell-shaped housing such that a flexible packaging material guided down the outside of the tube to form a stick pack downstream would have an excessively large diameter.

It would therefore also be advantageous to provide a powder filling machine to be used in conjunction with a stick pack package that reliably allowed and arrested the flow of free-flowing and very-free flowing powders without inhibition to the downstream packaging in a stick pack format and/or widening of the diameter of the stick pack.

It would furthermore be advantageous to provide a spinning disc with physical dimensions to arrest the flow of free-flowing and very free-flowing powders that could be retrofitted to existing stick pack powder filling machines.

It is therefore an aim of embodiments of the invention to mitigate or reduce a disadvantage presented by the prior art.

SUMMARY OF THE INVENTION

According to a first aspect of the invention there is provided a powder dispenser comprising a tube of circular cross-section; an auger extending axially through the tube; and a disc-shaped distributor extending laterally to the axis of the tube and partially closing the tube, wherein the disc-shaped distributor comprises a central ring and arms extending radially therefrom, characterised in that, the central ring has a radius of between 55%-90% of the internal radius of the tube; at least one of the arms extends to no more than 1 mm from the internal wall of the tube; and wherein there is a distance defined by a circular arc, concentric with the tube, between each arm at a distance of 1 mm from the tube wall of between 30%-65% of the internal radius of the tube.

In some embodiments, the powder dispenser is a beverage powder dispenser.

In some embodiments, the circular arc distance between each arm of the disc-shaped distributor at a distance of 1 mm from the tube wall is between 35% and 65%; 30% and 60%; or 40% and 60% of the internal radius of the tube. The inventors have found that within the 30%-65% range, the disc-shaped distributor works well for some time without blockage or powder buildup, and that within the range 35%-65% the disc-shaped distributor works indefinitely without significant powder build up.

In some embodiments, the circular arc distance, concentric with the tube, between each arm of the disc-shaped distributor at a distance of 1 mm from the tube wall is between 2 mm and 7.5 mm or between 3 mm and 7 mm Disc-shaped distributors with such distances between arms have the particular advantages of an excellent balance of good flow of powder when in rotation and good cessation of powder flow when not in rotation; and ease of manufacture.

In some embodiments, the radius of the central ring of the disc-shaped distributor is between 55% and 85%; or 60% and 85% of the internal radius of the tube. In some embodiments, the internal radius of the tube is between 10 mm and 14 mm and the radius of the central ring of the disc-shaped distributor is between 7 mm and 9 mm; preferably the internal radius of the tube is between 11 mm and 13 mm and the radius of the central ring of the disc shaped distributor is between 7.5 mm and 8.5 mm.

In other embodiments, the internal radius of the tube is between 7 mm and 9 mm and the radius of the central ring of the disc-shaped distributor is between 5 mm and 7 mm; preferably the internal radius of the tube is between 7.5 mm and 8.5 mm and the radius of the central ring of the disc shaped distributor is between 5.5 mm and 7 mm.

Disc-shaped distributors with a central ring and tube with such dimensions have the particular advantages of an excellent balance of good flow of powder when in rotation and good cessation of powder flow when stationary by facilitating powder build up on the disc-shaped distributor when not in rotation; and economic use of materials.

In some embodiments, the disc-shaped distributor comprises between 4 and 12 arms and preferably between 6 and 10 arms.

In embodiments where the internal radius of the tube is between 10 mm-14 mm or 11 mm-13 mm, the width, along the plane of cross-section of the tube, of each arm of the disc-shaped distributor is preferably between 1.5 mm-2.5 mm. In embodiments where the internal radius of the tube is between 7 mm-9 mm or 7.5 mm-8.5 mm the width, along the plane of cross-section of the tube, of each arms of the disc-shaped distributor is preferably between 1 mm-2 mm.

Disc-shaped distributors with this number of arms have the particular advantages of an even powder flow when in rotation; good upstream powder bridging between arms when not in rotation; and ease of manufacture. In particular, arms with the stated width dimensions have the additional particular advantage of improved surface area and rigidity in use.

In some embodiments, the central ring of the disc shaped distributor extends up to 4 mm from the plane of the disc-shaped distributor, preferably the central ring of the disc-shaped distributor extends up to 3 mm, 2 mm or 1 mm from the plane of the disc shaped distributor. In some embodiments, the central ring extends from the plane of the disc-shaped distributor by these amounts on one or on both sides. In such embodiment the central ring has a greater depth than the arms, in the longitudinal direction of the tube.

Such embodiments have the particular advantages of ease of manufacture and identification and straightforward addition of a central ring to adapt an existing disc-shaped distributor not of the invention to one of the invention. Embodiments where the central ring extends from both sides of the disc-shaped distributor have the particular advantage of the disc-shaped distributor being reversible and eliminating the risk of insertion in the unintended orientation.

In some embodiments, the central ring of the disc-shaped distributor further comprises at least one aperture, each with a maximum width, in a direction along the radius of the tube, of no more than 30%; 26%; 24% or preferably no more than 22% of the radius of the tube.

In some embodiments, the central ring of the disc-shaped distributor further comprises at least one aperture, each with a maximum width, in a direction along the radius of the tube, of no more than 2.5 mm.

Preferably the apertures are in the form of slots or radial slots; more preferably the slots are concentric to the perimeter of the ring; most preferably the slots are also equally spaced.

A central ring with such apertures has the particular advantages of less build-up of powder in the tube of the powder dispenser over time and reduction in pressure within the tube when the disc-shape distributor and/or auger are in rotation.

In some embodiments, the area of all apertures in the central ring is no more than 15%, preferably no more than 12%, most preferably no more than 10% of the cross-sectional area of the tube.

A central ring with apertures with such limited overall size has the particular advantage of preventing excessive build-up of powder in the tube of the powder distributor over time whilst maintaining the powder stopping properties of the disc-shaped distributor when not in rotation.

In some embodiments, the disc-shaped distributor is within 50 mm, 40 mm, 30 mm, 20 mm or preferably within 10 mm of the end of the tube.

Such positions of the disc-shaped distributor have the particular advantage of preventing blockage of the tube after the disc-shaped distributor and greater flexibility in downstream operations.

In some embodiments, the outer diameter of the tube is between 25 mm and 60 mm; preferably between 30 mm and 50 mm Such outer diameters have the additional advantage of easy and reliable use with stick packs of dimensions acceptable to consumers, good packaging efficiency and good packaging fill times.

In some embodiments, the auger and disc-shaped distributor are operably connected, preferably the disc-shaped distributor and auger are operably connected and separable. In preferred embodiments the disc-shaped distributor is connected at the end of the auger, but in other embodiments may be connected part-way along the auger, within the tube.

In some embodiments, the disc-shaped distributor is driven by the rotation of the auger.

Such embodiments have the particular advantage of simplicity in operation and manufacture; and only requiring a single drive motor.

In some embodiments, the powder dispenser further comprises a powder with Hausner's ratio of between 1.00-1.25.

Powder dispensers with such powders have the particular advantages of excellent powder flow properties; reduced blockages and/or build up of powder in the tube of the powder dispenser.

In some embodiments, the powder is a beverage powder.

According to a second aspect of the invention there is provided a method of dispensing powder comprising:
a—providing a powder dispenser of the first aspect of the invention;
b—adding a powder;
c—rotating the auger and/or disc-shaped distributor to convey the powder through and out of the tube;
d—collecting the powder in a container.

In some embodiments the powder is a consumable powder, preferably a beverage powder, especially a powder comprising milk, coffee, tea, creamer, sugar and/or n artificial sweetener.

In some embodiments, the powder has a Hausner's ratio of between 1.00 and 1.25, 1.00 and 1.22, 1.00 and 1.20 or, preferably, between 1.05 and 1.18.

Methods using the powder dispenser of the first aspect of the invention and comprising such powders have the particular advantages of excellent powder flow properties; reduced blockages and/or build-up of powder in the tube of the powder dispenser.

In some embodiments the container has a diameter of between 25 mm and 55 mm, preferably between 30 mm and 50 mm, most preferably between 35 mm and 45 mm.

In some embodiments, between 10 g and 50 g, preferably between 15 g and 40 g and most preferably between 15 g and 30 g of powder is added to the container.

Such fill weights have the particular advantage of excellent dosing for end consumer use.

In some embodiments, powder is collected by a plurality of containers in sequence.

In some embodiments the or each container comprises a flexible film.

In some embodiments the or each container is formed at the point of powder collection.

According to a third aspect of the invention, there is provided a powder filling machine comprising the powder dispenser of a first aspect of the invention and a packaging apparatus.

In some embodiments the packaging apparatus is a flexible film packaging apparatus, preferably a stick pack packaging apparatus.

DETAILED DESCRIPTION OF THE INVENTION

In order that the invention may be more clearly understood embodiments thereof will now be described, by way of example only, with reference to the accompanying drawings, of which:

FIGS. 3a-j are perspective views of numerous different failing designs of spinning discs (14) used in conjunction with the powder filling machine (1) of FIG. 1 and not falling within the scope of the spinning discs used in the claimed invention.

FIGS. 4a-c FIG. 4a is a perspective view of a first embodiment of a spinning disc used in conjunction with the powder filling machine (1) of FIG. 1, and which together form a powder dispenser of the invention.

FIGS. 5a-c FIG. 5a is a perspective view of a second embodiment of a spinning disc used in conjunction with the powder filling machine (1) of FIG. 1, and which together form a powder dispenser of the invention.

FIGS. 6a-c FIG. 6a is a perspective view of a third embodiment of a spinning disc used in conjunction with the powder filling machine (1) of FIG. 1, and which together form a powder dispenser of the invention.

Figure 1:
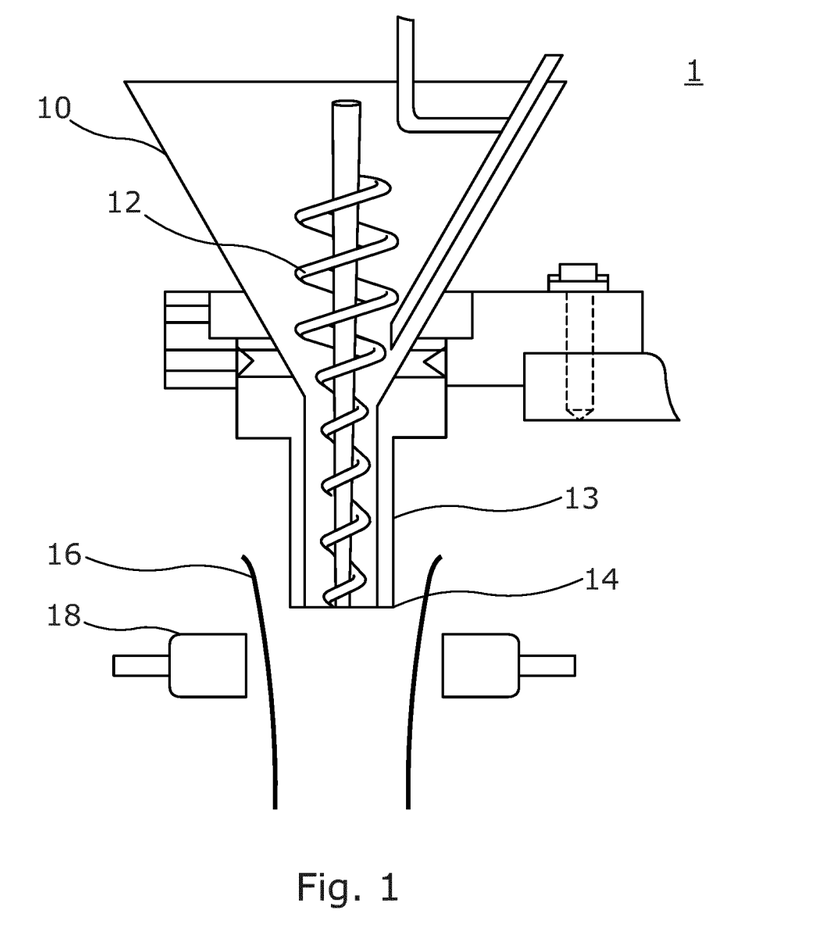
FIG. 1 is a schematic cross-section of a powder filling machine (1) of the prior art.

FIG. 1, shows a powder filling machine (1) of the prior art comprising a hopper (10); a vertical auger (12) extending through and out of the hopper and into a tube (13) connected to the downstream end of the hopper; a means of rotating the auger, in the form of a motor (not shown); a powder dispersion means, in the form of a spinning disc (14); a packaging material, in the form of flow wrap (16); and a packaging sealing means (18). The auger (12) extends from a motor (not shown) into the hopper (10) and down into the tube (13). The spinning disc (14) is attached to the end of the auger (12) within the tube (13) partially closing the tube (13) close to its end. The spinning disc (14) has an overall diameter sufficiently less than the internal diameter of the tube (13) in order to allow it to rotate freely within the tube (13) whilst preventing powder flow between the outer edge of the disc and the tube wall. The flow wrap (16) rests along the outside surface of the tube (13) and the packaging sealing means (18) is beyond the end of the tube (13).

In use, the hopper (10) is loaded with powder to be dispensed from the tube (13). The spinning disc (14) and auger (12) are rotated together by the motor (not shown). The auger (12) drives the powder through the tube (13) and the spinning disc (14) disperses and dispenses the powder from the end of the tube (13) into the flow wrap (16). When not being rotated, the auger (12) no longer drives powder through the tube (13) and the spinning disc (14), no longer rotating, has shape and size configured to arrest the flow of powder from the tube (13) and prevent any "dribbling" of powder from the tube (13) in this stationary state. The duration of the period of rotation of the auger (12) and spinning disc (14) determine how much powder is dispensed into the flow wrap (16). Upon cessation of the rotation of the auger (12) and spinning disc (14), the sealing means (18) seals the flow wrap providing a top seal on the filled package and a bottom seal for the next package. Prevention of "dribbling" is important to produce a good seal between faces of the flow wrap (16) and correct packaging fill volume.

Figure 2:
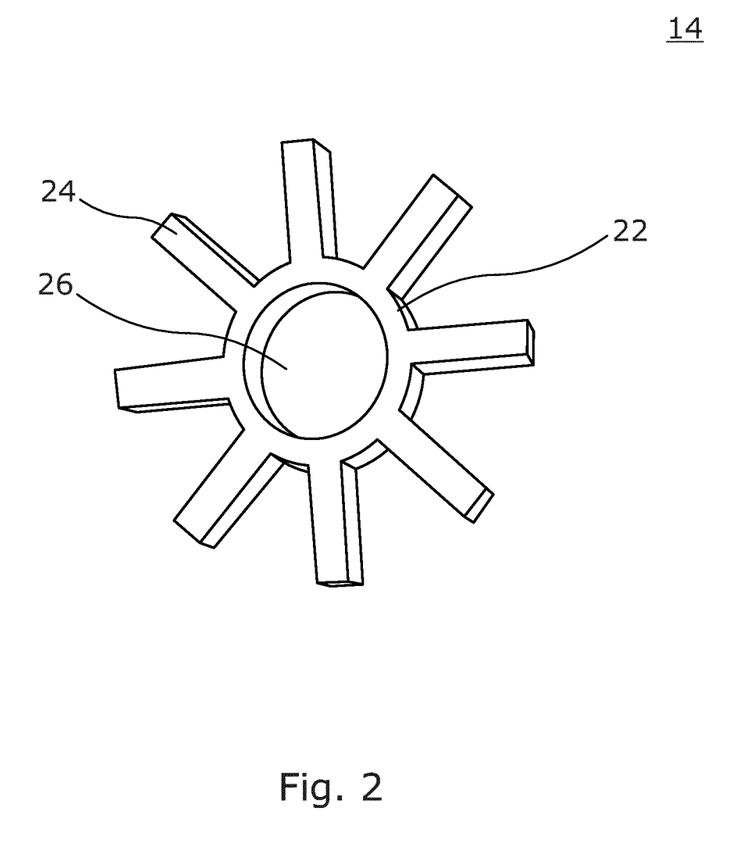
FIG. 2 is a top down view of a spinning disc (14) of the prior art used in conjunction with the powder filling machine (1) of FIG. 1.

With reference to FIG. 2, where like numbers represent like components compared to FIG. 1, the spinning disc of the prior art (14) has an overall diameter of 24 mm and comprises a central ring (22) with radius 5.5 mm; 8 arms (24) and a central attachment means, in the form of a hole (26) with radius 4.05 mm. The 8 arms (24) extend from and are evenly spaced about the circumference of the ring (22); each arm (24) has a width of 2 mm. The largest diameter of the spinning disc (14) is 24 mm and it is designed to be used at the end of the tube (13) of the powder filling machine (1) of FIG. 1.

The spinning disc of FIG. 2 when used in conjunction with the powder filling machine (1) of 1, with an industry standard tube (13) having an external diameter of 45 mm and an internal diameter of 25 mm (radius 12.5 mm), is not of the invention, as the central ring (22) has a radius of 44% of the radius of the tube (13) and the circular arc distance, concentric with the tube, between each arm of the disc-shaped distributor at a distance of 1 mm from the tube wall is 7.42 mm, 59.4% of the internal radius of the tube (13).

It will be understood that when describing the spinning discs various dimensions are relied upon. With reference to the spinning disc (14) of FIG. 2, when describing the radius of the ring of a spinning disc (22) the radius is measured from the theoretical centre of the disc to the outer edge of the ring. When describing the radius of a disc (14), measurement is taken from the theoretical centre of the disc to the outer tip of the point on the disc that is furthest from the centre, in most embodiments of the invention, this point is the tip of one of the arms (24). A diameter is therefore calculated as a radius multiplied by 2.

Figure 3A:
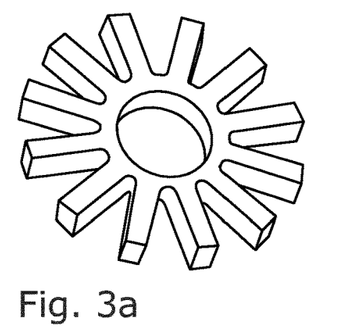
Figure 3B:
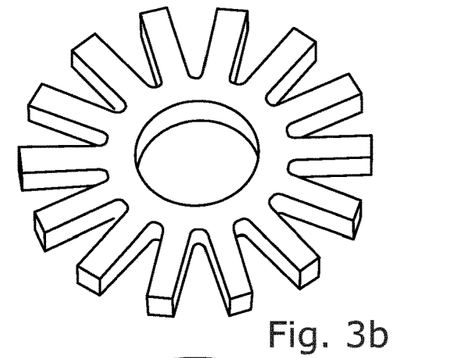
Figure 3C:
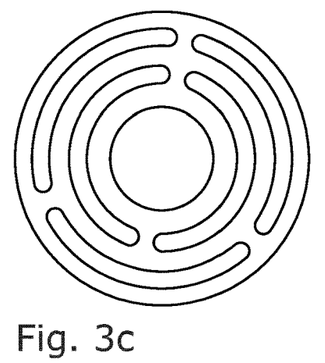
Figure 3D:
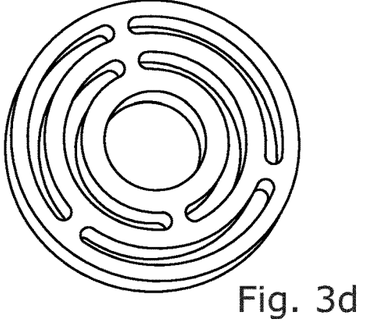
Figure 3E:
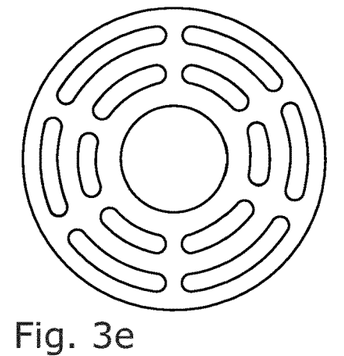
Figure 3F:
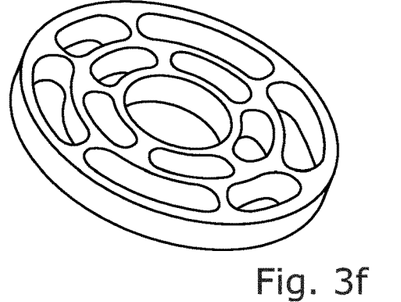
Figure 3G:
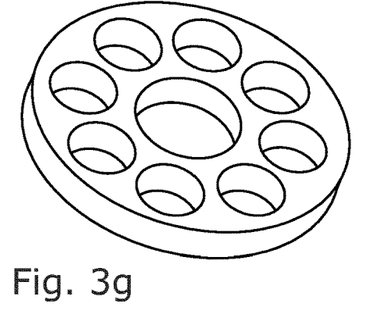
Figure 3H:
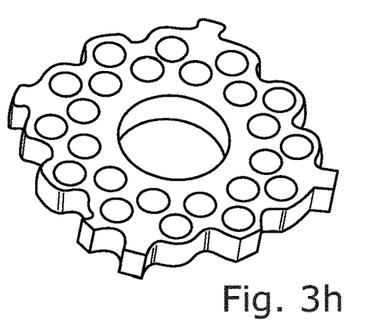

With reference to FIGS. 3a-3h: FIG. 3a is of a spinning disc comprising a central attachment hole with radius 4.05 mm; a central ring with radius 5.5 mm and 12 arms; FIG. 3b is of a spinning disc comprising a central attachment hole with radius 4.05 mm; a central ring with radius 5.5 mm and 14 arms; FIG. 3c is of a spinning disc comprising a central attachment hole with radius 4.05 mm; a central ring with radius 5.5 mm and 5 1.5 mm wide radial slots; FIG. 3d is of a spinning disc comprising a central attachment hole with radius 4.05 mm; a central ring with radius 5.5 mm and 2.5 mm wide radial slots; FIG. 3e is of a spinning disc comprising a central attachment hole with radius 4.05 mm and 12 1.5 mm wide radial slots; FIG. 3f is of a spinning disc comprising a central attachment hole with radius 4.05 mm and 11 radial slots; FIG. 3g is of a spinning disc comprising a central attachment hole with radius 4.05 mm and 8 5 mm diameter holes; FIG. 3h is of and a spinning disc comprising a central attachment hole with radius 4.05 mm; an array of 2.5 mm diameter holes and an undulating perimeter. Each of the spinning discs of FIGS. 3a-3h have a largest diameter of 24 mm and are designed to be used at the end of the tube (13) of the powder filling machine (1) of FIG. 1.

None of the spinning discs of FIGS. 3a-3h when used in conjunction with the powder filling machine (1) of FIG. 1, with tube (13) internal diameter of 25 mm, are of the invention. With reference to FIG. 3a, the central ring has a radius of 44% of the radius of the tube (13) and the circular arc distance, concentric with the tube, between each arm of the disc-shaped distributor at a distance of 1 mm from the tube wall is 4.28 mm, 34.3% of the radius of the tube (13). With reference to FIG. 3b, the central ring has a radius of 44% of the radius of the tube (13) and the circular arc distance, concentric with the tube, between each arm of the disc-shaped distributor at a distance of 1 mm from the tube wall is 3.39 mm, 27.1% of the radius of the tube (13). With reference to FIGS. 3c; 3d; 3e; 3f and 3g, the central ring has a radius of 44% of the internal radius of the tube (13) and there are no arms or arm gaps. With reference to FIG. 3h there is no central ring, nor arms or arm gap.

Figure 4A:
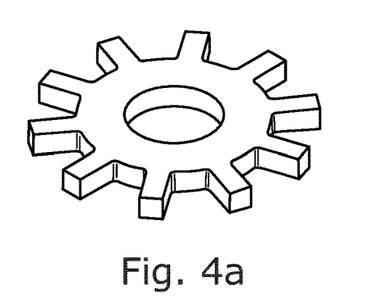
Figure 4B:
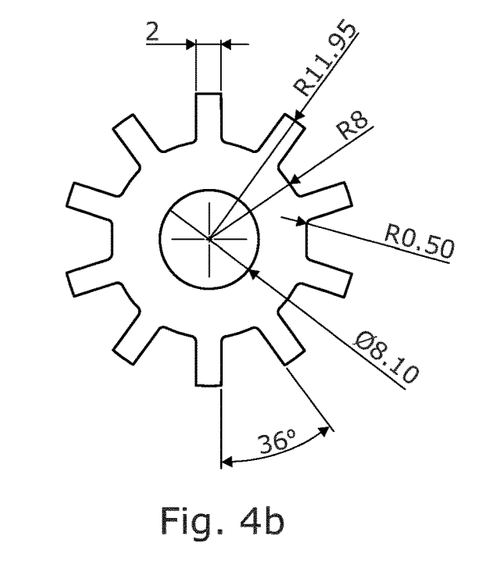
FIG. 4b is a plan view and FIG. 4c is a side-view of the same spinning disc.
Figure 4C:
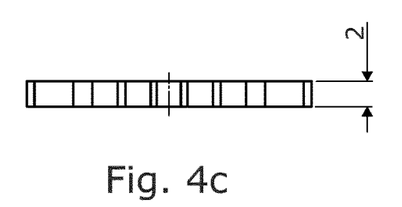

FIGS. 4a-4c show a first embodiment of a spinning disc used in conjunction with the powder filling machine (1) of FIG. 1 to form a powder dispenser of the invention, with tube (13) internal diameter 25 mm (radius 12.5 mm), the spinning disc has height 2 mm (i.e. height in the longitudinal direction of the tube (13); a central attachment hole with radius 4.05 mm; a central ring with radius of 8 mm, 64% of the radius of the tube (13); ten arms extending from the central ring to a distance of 12 mm from the centre of the disc, with circular arc distance of 5.5 mm, 44.3% of the internal radius of the tube (13) at 1 mm from the tube wall.

Figure 5A:
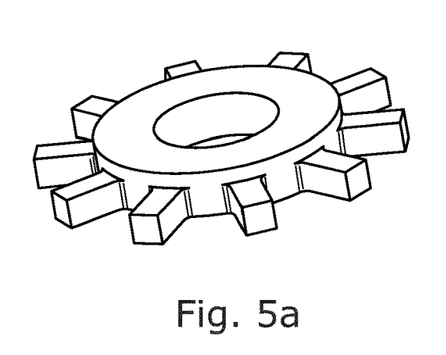
Figure 5B:
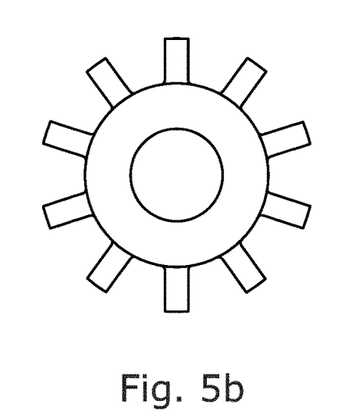
FIG. 5b is a plan view and FIG. 5c is a side-view of the same spinning disc of the invention.
Figure 5C:
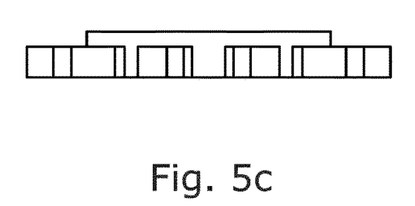

FIGS. 5a-5c show a second embodiment of a spinning disc used in conjunction with the powder filling machine (1) of FIG. 1 to form a powder dispenser of the invention, with tube (13) internal diameter of 25 mm, is similar to that of FIGS. 4a-4c and differs only in that the central ring extends in height (longitudinal direction of the tube) 1 mm from the plane of the arms (i.e. is thicker in the longitudinal direction of the tube (13). Without wishing to be bound by theory, the inventors believe that if the central ring extends significantly more than 1 mm, such as for example 4 mm or more, from the plane of the arms a narrow channel and flow restriction is created between the side of the central ring and the tube wall increasing the likelihood and/or incidence of powder blockage of the tube over time.

The spinning disc of FIG. 5a-5c may be used in the powder filling machine (1) in either of the two possible orientations (central ring extending towards the hopper (10) or away from it). An embodiment of the invention, not shown, exists where the central ring extends by 1 mm from both sides of the disc. This embodiment has the particular advantage of being able to be used either way up to reduce the risk of installation error.

Figure 6A:
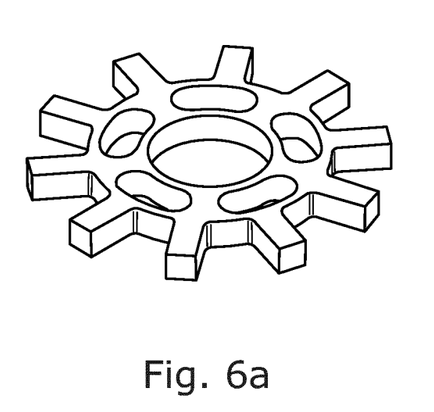
Figure 6B:
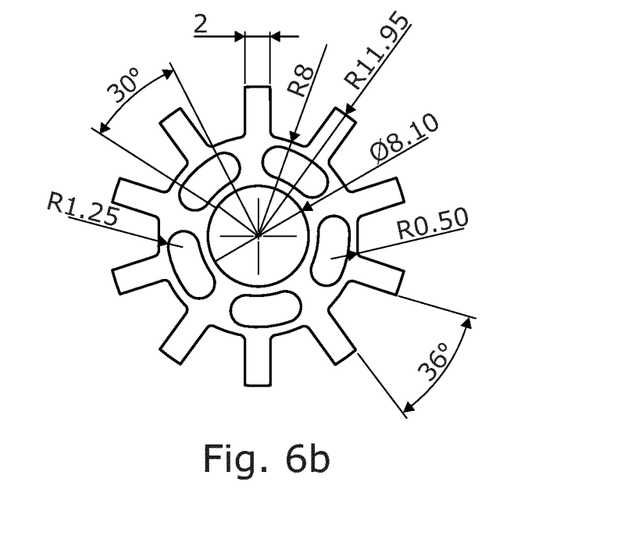
FIG. 6b is a plan view and FIG. 6c is a side-view of the same spinning disc of the invention.
Figure 6C:
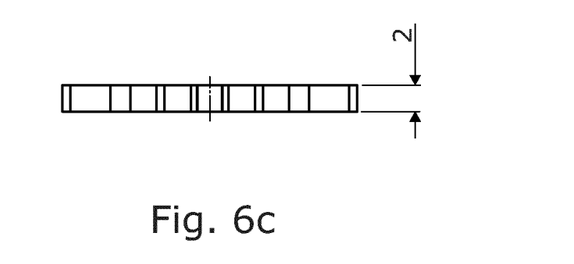

FIGS. 6a-6c show a third embodiment of a spinning disc used in conjunction with the powder filling machine (1) of FIG. 1 to form a powder dispenser of the invention, with tube (13) internal diameter of 25 mm, the spinning disc has height 2 mm; a central attachment hole with radius 4.05 mm; a central ring with radius 8 mm, 64% of the radius of the tube (13); the central ring comprises five 2.5 mm wide (20% of the internal radius of the tube) radial slots and ten 2 mm wide arms, extending from the central ring to a distance of 12 mm from the centre of the disc, with circular arc distance of 5.5 mm, 44.3% of the internal radius of the tube (13) at 1 mm from the tube wall. The five radial slots occupy a total area of 44.2 mm$^2$, 9% of the cross-sectional area of the tube (13).

Figure 7:
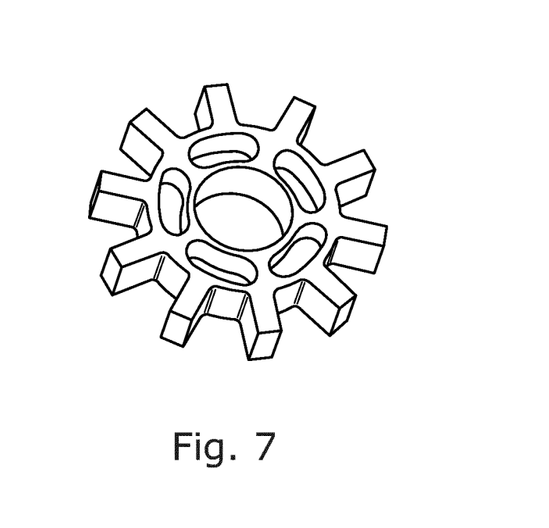
FIG. 7 is a perspective view of an alternative embodiment of the spinning disc of FIG. 6 used in conjunction with the powder filling machine (1) of FIG. 1, and which together form a powder dispenser of the invention.

FIG. 7 shows a fourth embodiment of a spinning disc used in conjunction with the powder filling machine (1) of FIG. 1 to form a powder dispenser of the invention, with tube (13) internal diameter of 25 mm, the spinning disc is similar to that of FIGS. 6a-6c and differs only in that it comprises 12 arms with circular arc distance, concentric with the tube, between each arm of the disc-shaped distributor at a distance of 1 mm from the tube wall of 4.3 mm, 34.3% of the internal radius of the tube.

Figure 8:
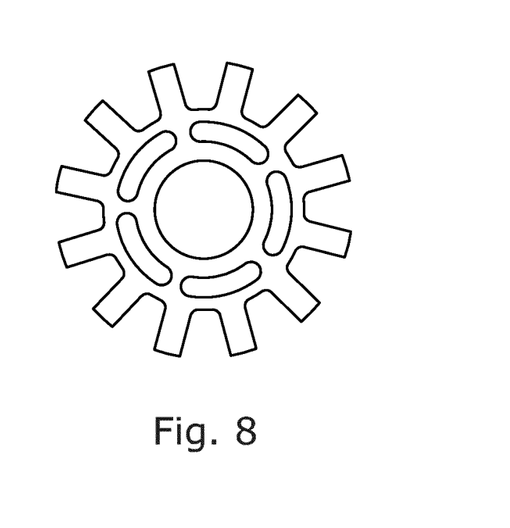
FIG. 8 is a perspective view of another alternative embodiment of the spinning disc of FIG. 6 used in conjunction with the powder filling machine (1) of FIG. 1, and which together form a powder dispenser of the invention.

FIG. 8 shows a fifth embodiment of a spinning disc used in conjunction with the powder filling machine (1) of FIG. 1 to form a powder dispenser of the invention, with tube (13) internal diameter of 25 mm, the spinning disc of the invention is similar to that of FIG. 6a-6c and differs only in that the central ring comprises five 1.5 mm wide (12% of the internal radius of the tube) radial slots. The five radial slots occupy a total area of 20.67 mm$^2$, 4.2% of the cross-sectional area of the tube (13).

Example 1—First Test Powder

A model TM70-ZC, manufactured by Toyo Machine Manufacturing Co. Ltd Powder filling machine (1) with the layout of FIG. 1, with a tube (13) with outside diameter of 45 mm and an internal diameter of 25 mm was provided and the hopper (10) filled with a First test powder.

The First test powder was a spray dried powder comprising: 37% sugar, 19% skimmed milk powder, 37% creamer, 0.5% xanthan gum, 1% flavour and 5.5% soluble coffee, having Hausner's ratio 1.08, a 'very free-flowing powder' by the classification of Table 1, and x50 particle size distribution 197 microns.

A composite flow wrap packaging material was fitted around the tube (13) of the powder filling machine of FIG. 1 in order to produce a stick pack package of 45 mm diameter and 180 mm length.

The Powder filling machine was set to run at a rate of 37 stick packs per minute with a powder fill weight of 21.5 g.

The auger was set to rotate at a rate of 35-42 rotation per minute.

Each of the different designs of spinning discs (14) of FIGS. 2-3 (not falling within the scope of the claimed invention) and FIGS. 5-8 (falling within the claimed scope of the invention) were attached to the end of the auger (12) by the central attachment hole (26); the powder filling machine was run for 6 hours for each different disc, whilst 1. The extent of blockage of the tube (13) by the First test powder, during operation, and 2. The extent of test powder leakage through the spinning disc (14), when rotation was stopped, were both measured. The results are recorded in Table 2.

TABLE 2

Results of trials with numerous different spinning disc designs and a First test powder.

| Spinning disc ID | 1. Extent of tube blockage | 2. Extent of powder leakage past disc when not rotating |
|---|---|---|
| FIG. 2 | Not blocked after 6 hours | Powder flow not arrested |
| FIG. 2: variant with 10 arms | Not blocked after 6 hours | Powder flow not arrested |
| FIG. 3a | Blocked before completion of trial | No powder leakage |
| FIG. 3b | Blocked before completion of trial | No powder leakage |
| FIG. 3c | Blocked rapidly | No powder leakage |
| FIG. 3d | Blocked rapidly | No powder leakage |
| FIG. 3e | Blocked rapidly | No powder leakage |
| FIG. 3f | Blocked rapidly | No powder leakage |
| FIG. 3g | Blocked rapidly | Powder flow not arrested |
| FIG. 3h | Blocked before completion of trial | Powder flow not arrested |
| FIGS. 4a-c (of the invention) | Not blocked after 6 hours | No powder leakage |
| FIGS. 5a-c (of the invention) | Not blocked after 6 hours | No powder leakage |
| FIGS. 6a-c (of the invention) | Not blocked after 6 hours | No powder leakage |
| FIG. 7 (of the invention) | Not blocked after 6 hours, some signs of powder build up on the disc | No powder leakage |
| FIG. 8 (of the invention) | Not blocked after 6 hours, some signs of powder build up on the disc | No powder leakage |

The spinning disc of FIG. 2 and a variant of the spinning disc of FIG. 2 with 10 arms evenly spaced around the circumference of the disc did not prevent powder flow from the tube (13) when rotation was stopped. Without wishing to be bound by theory, the inventors believe that these discs lacked sufficient body towards the centre of the tube to provide a surface for the powder to stack upon when not in rotation, such that even when a variant with 10 arms was substituted, powder flow was not prevented. The spinning disc of the FIG. 2 variant with 10 arms had identical dimensions to that of FIG. 2, varying only in that it comprised 10 arms and the gap between the arms at, a distance of 1 mm from the tube wall, was 5.5 mm (44.3% of the radius of the tube)

The spinning discs of FIGS. 3a, 3b stopped powder flow when not in rotation yet resulted in build-up of powder back through the tube during the period of the trial. These spinning discs are simple 12 and 14 arm variants of the spinning disc of FIG. 2. Without wishing to be bound by theory, the inventors believe that the introduction of additional arms had the effect of preventing the flow of powder when not in rotation yet introduced sufficient additional body to the spinning discs such that powder did not flow freely from the tube when in rotation throughout the duration of the trial.

The spinning discs of FIGS. 3c, 3d, 3e, 3f and 3g all stopped powder flow when not in rotation yet resulted in build-up of powder back through the tube during the period of the trial. Without wishing to be bound by theory, the inventors believe that the distribution of mass about the body of these discs did not take sufficient advantage of the forces imposed by rotation to allow the free-flowing of the test powder when under rotation and highlight the difficulty felt in overcoming the challenges of the prior art.

The spinning disc of FIG. 3h neither prevented flow when not in rotation nor prevented build-up of powder and blockage of the tube during the trial.

The spinning discs of FIGS. 4a-c, 5a-c, 6a-c, 7 and 8 all showed good performance in stopping powder flow when not in rotation and did not result in a blocked tube during the period of the trial. Without wishing to be bound by theory, the inventors believe that the additional body provided by a central ring with the dimensions as claimed in combination with the gap between the arms at 1 mm from the internal wall of the tube (13) in these embodiments provide a surface sufficient for powder build up within the tube when the disc is not in rotation yet when in rotation allow sufficient void space between the arms for powder to flow freely past the disc. The spinning discs of FIGS. 7 and 8 showed some signs of powder build up on the arms of the spinning disc after the trial period, without wishing to be bound by theory, the inventors believe this slight build up to attributed to the number of arms and gap between the arms being close to the limit of the scope of the invention.

Example 2—Second Test Powder

A second set of trials were conducted in an identical way to those of Example 1, the only change made was that a Second test powder was used rather than the First test powder of Example 1. The Second test powder was a spray dried powder with the same composition as the First test powder but because of different spray drying process parameters and extent of drying had a higher Hausner's ratio of 1.18 and was a 'free-flowing powder' by the classifications in Table 1.

The results of the second set of trials with the Second test powder are given in Table 3.

TABLE 3

Results of trials with numerous different spinning disc designs and a Second test powder.

| Spinning disc ID | 1. Extent of tube blockage | 2. Extent of powder leakage past disc when not rotating |
|---|---|---|
| FIG. 2 | Not blocked after 6 hours | Powder flow not arrested |
| FIG. 2: variant with 10 arms | Not blocked after 6 hours | Powder flow not arrested |
| FIG. 3a | Blocked rapidly | No powder leakage |
| FIG. 3b | Blocked rapidly | No powder leakage |
| FIG. 3c | Blocked rapidly | No powder leakage |
| FIG. 3d | Blocked rapidly | No powder leakage |
| FIG. 3e | Blocked rapidly | No powder leakage |
| FIG. 3f | Blocked rapidly | No powder leakage |
| FIG. 3g | Blocked rapidly | Powder flow not arrested |
| FIG. 3h | Blocked rapidly | Powder flow not arrested |
| FIGS. 4a-c | Showing signs of build-up but not blocked after 6 hours | No powder leakage |
| FIGS. 5a-c | Showing signs of build-up but not blocked after 6 hours | No powder leakage |
| FIGS. 6a-c | Not blocked after 6 hours | No powder leakage |
| FIG. 7 | Not blocked after 6 hours, some signs of powder build up on the disc | No powder leakage |
| FIG. 8 | Not blocked after 6 hours, some signs of powder build up on the disc | No powder leakage |

Results were generally comparable to those of Example 1, with a general trend towards more tube blockages and less powder leakage with the less free-flowing powder of Example 2. The disc designs of FIG. 2 and the variant of FIG. 2 with 10 arms failed in the same way as Example 1. The disc designs of FIGS. 3a-3h failed by blocking of the tube more rapidly and the design of FIG. 3d did not fail by leakage of powder when not in rotation. As in Example 1, the spinning disc designs of FIGS. 4a-c, 5a-c, 6a-c, 7 and 8 stopped powder flow and did not block over the period of the trial with this less free-flowing Second test powder.

The spinning discs of FIGS. 6a-c, 7 and 8 showed enhanced resistance to build up of powder in the tube during operation. Without wishing to be bound by theory, the inventors believe that this was due to the passage of air through the piercings within the central ring of the spinning disc reducing any pressure build up beyond the spinning disc. Said piercings are believed to be sufficiently small so as not to compromise the powder stopping properties given by the enlarged central ring.

Without wishing to be bound by theory, the inventors believe that the distance between arms, the dimensions of the central ring, dimensions of any optional solid outer perimeter and the size and placement of any additional, optional, apertures through the disc are key to a successful spinning disc of this invention.

Example 3—35 mm Outside Diameter, 16 mm Inside Diameter Tube

Scaled-down variants of the spinning discs of FIGS. 2-7 used in Examples 1 and 2 were used in a powder filling machine of FIG. 1 with tube (13) scaled-down to an outside diameter of 35 mm and an inside diameter of 16 mm.

The scaled-down variants of the spinning discs had the following dimensions:

Each scaled-down disc had a central attachment hole with radius 2.5 mm, arm width of 1.5 mm (measured across the cross-section of the tube) and a disc diameter of 15 mm Other dimensions of the scaled-down spinning disc are as shown in Tables 4, 5 and 6.

TABLE 4

Dimensions of scaled-down spinning discs of FIGS. 2-3c.

| | FIG. 2 for 35 mm tube | Alt. FIG. 2 (10 arm) for 35 mm tube | FIG. 3a for 35 mm tube | FIG. 3b for 35 mm tube | FIG. 3c for 35 mm tube |
|---|---|---|---|---|---|
| central ring radius (mm) | 4 | 4 | 4 | 4 | 4 |
| central ring radius (% of tube radius) | 50.0% | 50.0% | 50.0% | 50.0% | 50.0% |
| number of arms | 8 | 10 | 12 | 14 | N/A |
| circular arc distance between arms 1 mm from tube (mm) | 4.39 | 3.21 | 2.43 | 1.87 | N/A |
| circular arc distance between arms 1 mm from tube (% of tube radius) | 54.9% | 40.2% | 30.3% | 23.3% | N/A |

TABLE 5

Dimensions of scaled-down spinning discs of FIGS. 3d-5.

| | FIG. 3d for 35 mm tube | FIG. 3e for 35 mm tube | FIG. 3f for 35 mm tube | FIG. 3g for 35 mm tube | FIG. 3h for 35 mm tube | FIGS. 4a-c for 35 mm tube | FIGS. 5a-c for 35 mm tube |
|---|---|---|---|---|---|---|---|
| central ring radius (mm) | 4 | 4 | 4 | 4 | 4 | 5.5 | 5.5 |
| central ring radius (% of tube radius) | 50.0% | 50.0% | 50.0% | 50.0% | 50.0% | 68.8% | 68.8% |
| number of arms | N/A | N/A | N/A | N/A | N/A | 10 | 10 |
| circular arc distance between arms 1 mm from tube (mm) | N/A | N/A | N/A | N/A | N/A | 3.21 | 3.21 |
| circular arc distance between arms 1 mm from tube (% of tube radius) | N/A | N/A | N/A | N/A | N/A | 40.2% | 40.2% |

TABLE 6

Dimensions of scaled-down spinning discs of FIGS. 6 and 7.

| | FIGS. 6a-c for 35 mm | FIG. 7 for 35 mm |
|---|---|---|
| central ring radius (mm) | 5.5 | 5.5 |
| central ring radius (% of tube radius) | 68.8% | 68.8% |
| number of arms | 10 | 12 |
| circular arc distance between arms 1 mm from tube (mm) | 3.21 | 2.43 |
| circular arc distance between arms 1 mm from tube (% of tube radius) | 40.2% | 30.3% |
| Number of slots | 5 | 5 |
| Slot width (mm) [via radius of tube] | 1.5 | 1.5 |
| Slot area (mm$^2$) | 16.6 | 16.6 |
| Slot area (% of cross-sectional area of tube bore) | 8.3% | 8.3% |

The 35 mm variants of FIGS. 2 and 3a-j when used in conjunction with the scaled-down powder filling machine (1) of FIG. 1, with tube (13) outside diameter of 35 mm, are not of the invention.

The 35 mm variants of FIGS. 4-7 when used in conjunction with the scaled-down powder filling machine (1) of FIG. 1, with tube outside diameter of 35 mm, are of the invention.

The scaled-down powder filling machine (1) of FIG. 1, was fitted with each of the scaled-down spinning discs in Tables 4, 5 and 6 and loaded with the test powders of Examples 1 and 2 in turn such that each combination of spinning disc and test powder was tested. The same parameters of rotation speed, filling rate, test duration, etc of Example 1 were used.

A scaled-down equivalent of the spinning disc of FIG. 8 was not tested.

Results were found to be substantially the same as those obtained with the 45 mm versions used in Examples 1 and 2 with powder filling machines fitted with spinning discs of FIGS. 4-7 performing well in the tests of arresting powder flow when stationary yet preventing blockage of the tube (13) over time, were those fitted with spinning discs of FIGS. 2 and 3a-j failing one or both tests as in Examples 1 and 2.

Further variants of the scaled-down spinning discs of FIGS. 4-7 were tested with extended central rings up to radii of up to 6.8 mm, 85% of the internal radius of the tube in example 3 (all other dimensions remained the same). These variants showed the same excellent powder flow and stopping properties as those shown in Tables 4-6 without causing blockage over time.

The above embodiments are described by way of example only. Many variations are possible without departing from the scope of the invention as defined in the appended claims.

The invention claimed is:

1. A powder dispenser comprising a tube of circular cross-section; an auger extending axially through the tube; and a disc-shaped distributor extending laterally to the axis of the tube and partially closing the tube, wherein the disc-shaped distributor comprises a central ring and arms extending radially therefrom, characterised in that, the central ring has a radius of between 55%-90% of the internal radius of the tube; at least one of the arms extends to no more than 1 mm from the internal wall of the tube; and wherein there is a distance defined by a circular arc concentric with the tube between each arm at a distance of 1 mm from the tube wall of between 30%-65% of the internal radius of the tube.

2. The powder dispenser of claim 1 wherein the powder dispenser is a beverage powder dispenser.

3. The powder dispenser of claim 1 wherein the circular arc distance, concentric with the tube, between each arm of the disc-shaped distributor at a distance of 1 mm from the tube wall is between 35% and 65% of the internal radius of the tube.

4. The powder dispenser of claim 1 wherein the circular arc distance between each arm of the disc-shaped distributor at a distance of 1 mm from the tube wall is between 2 mm and 7.5 mm.

5. The powder dispenser of claim 1 wherein the radius of the central ring of the disc-shaped distributor is between 55% and 85% of the internal radius of the tube.

6. The powder dispenser of claim 1 wherein the internal radius of the tube is between 10 mm and 14 mm and the radius of the central ring of the disc-shaped distributor is between 7 mm and 9 mm.

7. The powder dispenser of claim 1 wherein the internal radius of the tube is between 7 mm and 9 mm and the radius of the central ring of the disc-shaped distributor is between 5 mm and 7 mm.

8. The powder dispenser of claim 1 wherein the disc-shaped distributor comprises between 4 and 12 arms.

9. The powder dispenser of claim 8 the disc-shaped distributor comprises between 6 and 10 arms.

10. The powder dispenser of claim 1 wherein the central ring of the disc-shaped distributor further comprises at least one aperture, each with a maximum width, in a direction along the radius of the tube, of no more than 30% of the radius of the tube.

11. The powder dispenser of claim 1 wherein the central ring of the disc-shaped distributor further comprises at least one aperture, each with a maximum width, in a direction along the radius of the tube, of no more than 2.5 mm.

12. The powder distributor of claim 10 wherein the central ring of the disc shaped ring comprises apertures and wherein, the area of all apertures in is no more than 15% of the cross-sectional area of the tube.

13. The powder dispenser of claim 1 wherein the disc-shaped distributor is within 10 mm, 20 mm, 30 mm, 40 mm, or 50 mm of the end of the tube.

14. The powder dispenser of claim 1 wherein the auger and disc-shaped distributor are operably connected.

15. The powder dispenser of claim 1, wherein the powder dispenser further comprises a powder with Hausner's ratio of between 1.00-1.25.

16. A method of dispensing powder comprising steps of:
A—providing the powder dispenser of claim 1;
B—adding a powder;
C—rotating the auger and/or disc-shaped distributor;
D—collecting the powder in a container.

17. The method of claim 16 wherein, the powder is a beverage powder.

* * * * *